United States Patent [19]

Pertzsch et al.

[11] 3,923,272

[45] Dec. 2, 1975

[54] MAGNETIC TAPE CASSETTE

[75] Inventors: Albert Pertzsch; Jose Toral; Gottfried Lutz, all of Munich; Werner Wilke, Starnberg; Anton Riedel, Neuried, all of Germany

[73] Assignee: AGFA-Gevaert Aktiengesellschaft, Leverkusen, Germany

[22] Filed: May 31, 1974

[21] Appl. No.: 474,869

[30] Foreign Application Priority Data

June 1, 1973 Germany ............................ 2327828

[52] U.S. Cl. .................................................. 242/199

[51] Int. Cl.$^2$..G03B 1/04; G11B 15/32; G11B 23/04

[58] Field of Search ........... 242/199, 200, 197, 198, 242/210, 54.1, 71.2; 352/72, 78 R; 360/961, 93

[56] References Cited

UNITED STATES PATENTS 3,556,433 1/1971 Abitboul ............................ 242/199

*Primary Examiner*—Leonard D. Christian

*Attorney, Agent, or Firm*—Connolly and Hutz

[57] ABSTRACT

The flangeless hubs of the pack are mounted on centering rings in the housing half members of the magnetic tape cassette. Support foils are arranged between the hub and the housing cover or base. The housing half members have a ring-shaped recess between each centering ring and an area which is partly covered by the hubs. In addition, the hubs are provided with a ring-shaped torus on the front surfaces adjoining the centering ring. The support foil also has symmetrical cuts, e.g. notches, slits, teeth, which extend in the radial direction, in the area of the recesses in the housing half members. As a result the hub is always kept in the centre plane of the cassette.

7 Claims, 4 Drawing Figures

MAGNETIC TAPE CASSETTE

The invention relates to a magnetic tape cassette, in particular a compact cassette, comprising two housing half members connected to one another which have centering rings serving to mount both flangeless hubs and support foils on both sides of the pack.

In the known magnetic tape cassettes, the tapes are wound on flangeless hubs which leave considerable axial clearance between the housing half members. As a result when carrying out different winding operations on the tape recorder, the individual layers of tape may become displaced and a ridged or saucer-shaped pack may be produced. When the ridges reach a height of 1 mm the pack brushes against the housing half members and blocks the cassette drive of the recorder. The use of especially designed foils or additional support means is known to reduce the wobbling of the flangeless hub or of the pack. In accordance with the different proposals foils are employed whose surface area only partly rests on the pack or the hub. In German Utility Model specification No. 1,940,355 the foils are provided with grooves or toruses which extend outwardly in a radial direction from the axis of the pack. The foils according to the German Utility Model No. 7,116,933 have edges running parallel to one another. In order to reduce telescopic displacement, especially corrugated foils or elastic fibre fleeces are also described. Variations on these proposals consist in that the foils are restricted to the region of the hubs or the first coils of the tape in order to reduce the friction surfaces. The aim of all these measures is to ensure maximum elasticity in guidance.

The object of the invention is an improved method for mounting packs in magnetic tape cassettes. It is essential that the new method ensures that the rotatable axis is exactly vertical to the plane of the cassette and that any deviations are kept to a minimum during the winding operations. In addition steps must be taken to prevent the torque for the pack from substantially increasing.

The object is attained in accordance with the invention by the following means:

a. ring-shaped recesses are provided in the housing half members between the centering rings and an area substantially covered by the flangeless hubs;
b. ring-shaped toruses are situated on the front surfaces of the hubs on the sides adjoining the centering rings;
c. the support foils are provided with indentations, notches or cuts of other shape in the area of the recesses in the housing half members.

In accordance with advantageous embodiments of the invention, the height of the ring-shaped toruses is proportioned so that the centre plane of the hub corresponds to that of the compact cassette and the number and shape of the cuts made in the support foil are chosen so that the resilience of the remaining projections is at least equal to the weight of the pack.

This embodiment of the cassette in accordance with the invention ensures precise mounting and guidance of the pack without the use of additional means. The ring-shaped toruses on the hub, which project into the recessed part of the housing half members, constitute with regard to the centering rings, an additional stabilization surface, which restricts wobbling of the hubs in the axial direction when the winding speed is greatly changed. This is given further support by the resilient arrangement of the pack on the foils provided with cuts.

In a particularly preferred embodiment of the invention the centering ring on the base of the cassette can be elevated on the take-up side of the cassette so that the centre plane of the flangeless hub likewise corresponds to that of the cassette and only the cassette cover has a ring-shaped recess between the centering ring and the area partially covered by the flangeless hub, and the hub only has a ring-shaped torus on its front surface facing the cover of the cassette; this torus partly projects into the recessed part of the cassette cover and the foils are provided with cuts, as described in the aforegoing, in the area of the recessed housing half member. The aforegoing features described for the take-up side are again found on the wind-off side with their positions laterally reversed. Due to the force of the resilience of the foil, which acts in the same direction as the force of gravity when the cassette is in a horizontal operating position, the hub is fixed on the take-up side of the cassette and permits of exact mounting of the pack without the use of other aids. From the economic point of view it is of particular value that the mass-production costs are the same as for the component parts of a simple magnetic tape cassette with a foil, since only the shape of the foil has to be altered and the shape of the usual parts to be changed in injection-moulding so as to adapt them to the invention.

The invention will be explained in greater detail below with reference to FIGS. 1 to 4, in which FIG. 1 is a plan view of a magnetic tape cassette according to the prior art;

Figure 1:
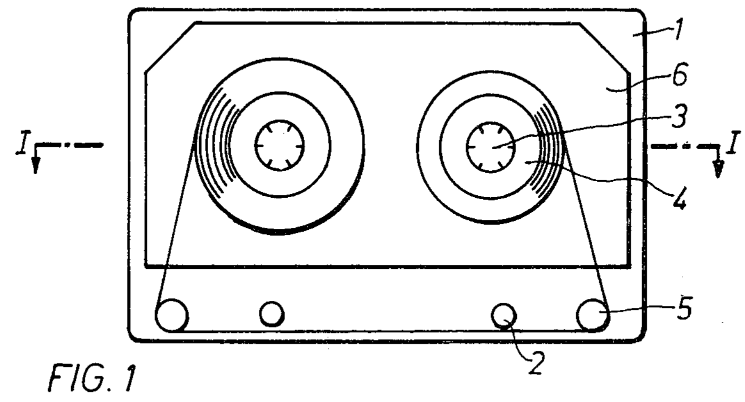
Figure 2:
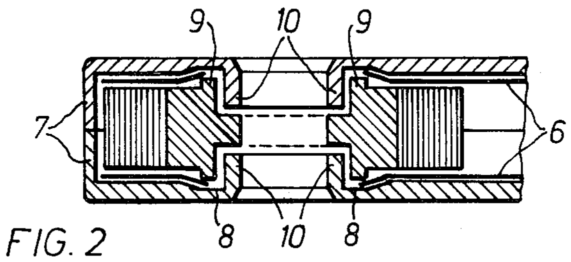
FIG. 2 is a cross-sectional view of the cassette half member along intersection line I—I in FIG. 1 in accordance with one embodiment of the invention.
Figure 3:
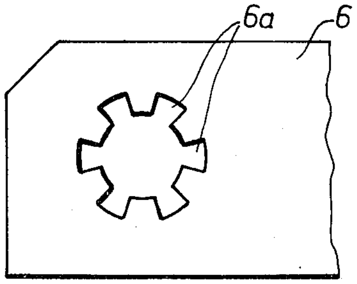
FIG. 3 is a partial view of the foil according to the invention.

A compact cassette according to FIGS. 1 and 2 has openings serving to admit the friction roller 2 on the apparatus and the winding mandrel 3. The magnetic tape is wound onto flangeless hubs 4 and passed over guide members 5. The packs are covered on both front sides by foils 6 which have toothed-rim cuts in the region of the hubs. At the same time both housing half members 7 have a ring-shaped recess in area 8 according to FIG. 2 which is partly covered by the hub. Each hub bears a ring-shaped torus 9 on its front side which partly projects into the recessed housing half members. The foils are fixed between the ring-shaped torus and recess. The ring-shaped torus acts as a buffer member against the centering ring, in particular, however as a support against the toothed foils in the area of the recess as a result of which the hub is sprung back to its original position upon any tendency to move out of the horizontal path. This special kind of mounting ensures that the hub in the cassette is always kept in the centre plane of the cassette, this constituting an essential prerequisite for exact mounting of the pack. The required resilience of the foils can be determined by the number and shape of the cuts. The latter may take the shape of notches, slits, teeth, and the like. To reduce the area of friction on the pack the foils may also have in a manner known per se impressions extending in a radial direction. The foils themselves consist of an elastic material which may also partly serve as layer supports for the magnetisable layer, such as, for example polyethylene terephthalate, polyvinyl chloride, polytetrafluoro-ethylene or paper. To improve the conductivity they may be pigmented with carbon black or graphite or coated with suitable layers for this purpose.

Figure 4:
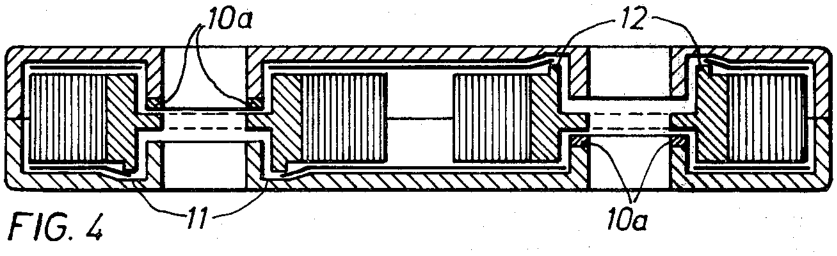
FIG. 4 is a cross-sectional view of the cassette along intersection line I—I in FIG. 1 according to a special embodiment of the invention.

FIG. 4 shows a special embodiment of the invention in which the centering ring 10 is elevated on the take-up side of the cassette by additional ring portions 10*a* so that the centre plane of the hub corresponds to that of the cassette. Instead of an extended or elevated centering ring the equivalent may be used in the form of an appropriately thick foil. In addition the cassette cover has a recess 11 between the centering ring and an area partly covered by the hub, and the hub itself is provided with a ring-shaped torus on its front surface on the side facing the cassette cover, as already described with reference to FIG. 2. In the same way the foil has cuts in the area of the recessed housing half members. The position of the above-mentioned features 10 and 12 are interchanged sidewise on the wind-off side, that is the centering ring of the cassette cover is elevated, the recess and ring-shaped torus are provided on the opposite side of the cassette. In this way the hub on the take-up side lies level and in the centre plane of the cassette, whilst the resilience of the foils forces the pack against the surface of the centering ring 10. Deviations of the hub from the horizontal position are thus reduced to a minimum and hence any irregular movements during operation of the cassette can rapidly be balanced out.

We claim:

1. A pack assembly for magnetic tape cassettes, in particular compact cassettes having housing half members, centering rings in the housing half members, flangeless hubs, said flangeless hubs being mounted on the centering rings and apertured resilient support foils being concentrically arranged between the flangeless hubs and the housing half members, said assembly also comprising a. the housing half members being annularly recessed laterally between the centering rings and an area partly covered by the flangeless hubs b. the flangeless hubs having a ring-shaped torus on the front surface adjacent the centering ring c. the resilient support foil being provided with an annular array of segmental cutouts and remaining fins in the area of the recesses in the housing half members, and d. the fins of the support foil being disposed at an inclination toward the hubs whereby they exert a centering force on the hubs to prevent them from wobbling and to reduce frictional resistance between the hubs and the housing half members.

2. The pack assembly according to claim 1 wherein the resilient support foils have such extensive cutouts that the resilient force of the remaining projections is at least equal to the weight of the pack.

3. The pack assembly according to claim 1, wherein the height of the ring-shaped torus is so proportioned that the flangeless hubs are kept in contact with the resilient support foils.

4. The pack assembly according to claim 1, wherein the housing half members include a cassette cover, a. the centering ring on the take-up side of the cassette is so far raised on the cassette base that the central plane of the flangeless hub substantially coincides with the separating plane of the cassette halves, b. the cassette cover is annularly recessed laterally between the centering ring and an area partly covered by the flangeless hub, c. the flangeless hub has a ring-shaped torus on its front surface facing the cassette cover which partly projects into the recessed part of the cassette cover, d. the side foils have cutouts in the region of the recesses in the cassette halves and, e. the aforegoing features a) to d) described for the take-up side are also disposed on the wind-off side with their positions reversed.

5. The pack assembly according to claim 1 wherein the portion of the support foils disposed away from the hubs is in the region of the magnetic tape wound on the hubs is disposed substantially parallel to the edge surface of the magnetic tape.

6. The pack assembly according to claim 1 wherein a ring-shaped torus is provided on both sides of the flangeless hubs.

7. The pack assembly according to claim 1 wherein segmental cutouts in the resilient support foils are disposed about circular apertures in the resilient support foils.

* * * * *

UNITED STATES PATENT AND TRADEMARK OFFICE

CERTIFICATE OF CORRECTION

PATENT NO. : 3,923,272

DATED : December 2, 1975

INVENTOR(S) : Albert Pertzsch, et al

It is certified that error appears in the above-identified patent and that said Letters Patent are hereby corrected as shown below:

Column 1, line 22, change "1,940,355" to -- 1,940,305 --.

Signed and Sealed this

*sixth* Day of *April 1976*

[SEAL]

*Attest:*

RUTH C. MASON
*Attesting Officer*

C. MARSHALL DANN
*Commissioner of Patents and Trademarks*